(12) United States Patent
Kato et al.

(10) Patent No.: US 7,310,806 B2
(45) Date of Patent: Dec. 18, 2007

(54) SUPPORT MECHANISM AND FEEDING UNIT INCLUDING SAME

(75) Inventors: Takahiro Kato, Kawagoe (JP); Kuniya Satomi, Kawagoe (JP); Nobuo Ishida, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 356 days.

(21) Appl. No.: 10/975,549

(22) Filed: Oct. 29, 2004

(65) Prior Publication Data

US 2005/0108742 A1  May 19, 2005

Related U.S. Application Data

(62) Division of application No. 10/058,857, filed on Jan. 30, 2002, now Pat. No. 6,880,164.

(30) Foreign Application Priority Data

Jan. 31, 2001  (JP)  ............................... P2001-24733

(51) Int. Cl.
*G11B 7/08*  (2006.01)
(52) U.S. Cl. .................................... 720/676
(58) Field of Classification Search ................ 720/672, 720/673, 674, 675, 676, 658, 663, 664, 665; 369/219.1, 242, 255; 360/276.3, 276.6, 266.2
See application file for complete search history.

(56) References Cited

U.S. PATENT DOCUMENTS

| 5,063,557 A | 11/1991 | Takamatsu et al. ......... 369/219 |
| 5,243,591 A | 9/1993 | Mogamiya ................... 369/244 |
| 5,535,076 A * | 7/1996 | Kamioka et al. ......... 360/267.4 |
| 5,546,252 A | 8/1996 | Hasegawa ................. 360/267.6 |
| 5,761,183 A | 6/1998 | Ikegame ..................... 369/220 |
| 5,872,766 A | 2/1999 | Chaya ........................ 369/244 |
| 5,889,755 A | 3/1999 | Kim ............................ 369/219 |
| 5,912,789 A * | 6/1999 | Konno et al. ............ 360/267.6 |
| 5,933,407 A | 8/1999 | Watanabe et al. ........... 369/247 |
| 5,982,735 A | 11/1999 | Tsai ............................ 369/219 |
| 5,995,479 A | 11/1999 | Takizawa et al. .......... 369/219 |
| 6,046,974 A | 4/2000 | Uehara ....................... 369/219 |
| 6,058,098 A * | 5/2000 | Kato ........................... 720/663 |
| 6,356,525 B1 | 3/2002 | Ikedo et al. ................ 369/219 |
| 6,483,798 B1 * | 11/2002 | Wu .............................. 720/676 |
| 2001/0006506 A1 * | 7/2001 | Aoyama et al. ............ 369/255 |
| 2001/0012261 A1 * | 8/2001 | Kim et al. ................... 369/219 |

FOREIGN PATENT DOCUMENTS

| EP | 1 189 214 | 3/2002 |
| JP | 10074370 A | 3/1998 |
| JP | 2000251422 | 9/2000 |
| JP | 2002100130 | 4/2002 |

* cited by examiner

*Primary Examiner*—Tianjie Chen
(74) *Attorney, Agent, or Firm*—Drinker Biddle & Reath LLP

(57) ABSTRACT

A supporting mechanism for movably supporting a member to be supported along a supporting shaft, comprises supporting members and a pressing device. The supporting members are provided on the member to be supported. Each of the supporting members comes into contact with the supporting shaft on at least two contact points so as to be movable on the supporting shaft. The at least two contact points are apart from each other. The pressing device presses the supporting members against the supporting shaft so that the contact points of each supporting member simultaneously come into contact with the supporting shaft.

10 Claims, 8 Drawing Sheets

SUPPORT MECHANISM AND FEEDING UNIT INCLUDING SAME

This is a divisional application of prior application No. 10/058,857, filed on Jan. 30, 2002, now U.S. Pat. No. 6,880,164, which is incorporated by reference herein in its entirety.

BACKGROUND OF THE INVENTION

1. Field of the Invention

The present invention relates to a support mechanism and a feeding unit including such a mechanism, and more specifically to a support mechanism, which moves a pickup for optically writing and reading information on and from a recording surface of a recording medium, along the recording surface thereof, while supporting the pickup, as well as a feeding unit including such a support mechanism.

2. Discussion of the Background

In recent years, optical discs including CDs (Compact Discs), DVDs (Digital Video Discs), and MDs (Mini Discs) have been put into practical use as information recording media onto or from which information is written and read utilizing an optical beam such as a laser beam.

A device, which is known as a pickup, is used to radiate an optical beam onto an information-recording surface of the optical disc and receive the light reflected from the surface. While the pickup is moved in parallel with the information-recording surface in the radial direction of the optical disc, the optical disc rotates. This rotation enables bits of information to optically be written or read onto or from information trucks formed spirally on the optical disc.

Referring to FIGS. 13 to 16, a conventional feeding unit for moving the pickup in the radial direction of the optical disc in parallel with the information-recording surface will now be described.

FIG. 13 is a plan view illustrating the conventional feeding unit, FIG. 14 is a cross-sectional view cut along the line. XIV-XIV in FIG. 13 (or FIG. 15) and FIG. 15 is a bottom view illustrating the conventional feeding unit. FIG. 16 is an enlarged cross-sectional view of a supporting mechanism included in the conventional feeding unit.

As shown in FIGS. 13 to 15, the conventional feeding unit S' includes a pickup casing 100 on which a pickup 100a is secured. The pickup 100a has a lens 101 and various drive parts. The lens 101 is used to radiate an optical beam B and receive light that is reflected on an optical disc DK. The drive parts drive optical parts, such as a semiconductor laser, and the lens 101, both of which produce the optical beam B cooperatively, in the trucking or focus direction of the optical disc DK.

The pickup casing 100 has two sides facing to each other. On one side thereof, two main support members 102 are mounted so as to protrude from the side. On the other side thereof, one sub support member 105 is mounted.

A through hole is formed through each of the two main support members 102 that allow a main shaft 103, which is secured by a not-shown chassis or others, to move through the through holes in the direction parallel with the direction of movement of the pickup casing 100. The main shaft 103 passing through the through holes permits the one side of the pickup casing 100 to be supported movably.

On the other hand, the sub support member 105 is formed so that it is able to pinch a sub shaft 106 secured by a not-shown chassis or other members in the direction parallel with the main shaft 103. The sub support member 105 receives the sub shaft 106. This receipt enables the other side of the pickup casing 100 to be supported movably by the sub shaft 106.

On the outer circumferential surface of the main shaft 103, a feeding screw 103a is made in the form of a helical to move the pickup casing 100 along the feeding screw. A rack gear 111 engaging with the feeding screw 103a is provided at the tip of a pressing spring 112 secured at the bottom of the pickup casing 100 with the help of a screw 113.

The pressing spring 112 presses the rack gear 111 in a pressing direction shown by an arrow in FIG. 16. This makes it possible that the rack gear 111 engages with the feeding screw 103a.

In the conventional feeding unit S', the main shaft 103 is driven to rotate by an electric motor not shown, with the result that the rack gear 111 engaging with the feeding screw 103a travels along the main shaft 103. Concurrently with this travel, the sub support member 105 travels along the sub shaft 106, which allows the pickup casing 100 itself to move in the radial direction of the optical disk DK together with the pickup 100a.

When the pickup casing 100 moves, delayed movement of the sub support member 105 relative to the movement of the rack gear 111 occurs due to friction between the sub shaft 106 and the surface of the sub support member 105, which comes into contact with the sub shaft 106. In such a case, force having a function of turning clockwise or counter-clockwise the pickup casing 100 in FIGS. 13 and 15 is applied to the pickup casing 100. The two main support members 102 are provided so as to be apart from each other, with the result that the pickup casing 100 is supported on the main shaft 103. In addition, a resilient force is applied to the region of the main shaft 103 between the two main support members 102 by means of the pressing spring 112. It is therefore possible to prevent the pickup casing 100 from turning clockwise or counterclockwise in FIGS. 13 and 15.

Further, in the conventional feeding unit S', in order to ensure a smooth movement of the pickup casing 100 with backlash of the pickup casing 100 restricted to a minimum, it is required that the through holes of the main support members 102 (through which the main shaft 103 passes) be worked with precision in relation to the diameter or other factors of the main shaft 103.

To realize such a higher precision, as shown in FIGS. 13 to 16, the conventional feeding unit S' adopts a metal bush 110 tightly inserted into the through hole of each main support member 102. Then, working of a sizing treatment is performed to raise the precision of a coaxial degree to the main shaft 103. Alternatively, the through holes are subjected to the finishing treatment of the through holes, which is conducted as the secondary finishing treatment. In addition, in the case that the main support members 102 are formed of resin, it is required to use a mold produced with precision. Even when any finishing treatment is used, it is required that the through holes be formed under severe quality control.

However, the conventional feeding unit S' having the above-described structure provides higher costs for the parts, because it is required that the inner surface of each through hole be formed with a high precision. In addition, in cases where suspended dusts go into the through hole and remain in a gap between the main shaft 103 and the through hole (see FIG. 16), it may be difficult for the pickup casing 100 to move smoothly.

SUMMARY OF THE INVENTION

An object of the present invention, which was made in view of the above-mentioned problems, is to provide a support mechanism that permits to decrease its manufacturing cost, minimize influences of dusts or others put on the main shaft on the movement of the pickup casing, and reduce frictional resistance generated between the main support member and the main shaft, leading to a smooth movement of the pickup casing, as well as to provide a feeding unit for a pickup casing, which includes such a support mechanism.

In order to realize the above object, the supporting mechanism of the present invention for movably supporting a member to be supported along a supporting shaft, comprises:

a plurality of supporting members provided on the member, each of said supporting members contacting with the supporting shaft on at least two contact points so as to be movable on the supporting shaft, the at least two contact points being apart from each other; and a pressing device for pressing the plurality of supporting members against the supporting shaft so that the contact points of each supporting member simultaneously come into contact with the supporting shaft.

Accordingly, the pressing device presses the plurality of supporting members against the supporting shaft so that the contact points of each supporting member simultaneously come into contact with the supporting shaft. All the contact points of each supporting member come into contact with the supporting shaft simultaneously and all of the plural supporting members come into contact with the supporting shaft simultaneously on the contact points. Hence, with the supporting members pressed on only the plurality of points as they contact the supporting shaft, the supporting members still hold the member in a stable manner. It is unnecessary to form the whole bodies of the supporting members with a high precision, which helps to reduce a manufacturing cost of the feeding unit itself. Additionally, even when dusts come onto the supporting shaft, influence of such dusts on the movement of the member can be minimized. Furthermore, a frictional resistance caused between the supporting members and the supporting shaft can be reduced remarkably to provide a smooth movement of the member to be supported.

Preferably, the supporting member has two contact surfaces, which include the contact points, respectively and are in parallel with the supporting shaft, and the pressing device comes into contact with the supporting shaft at a position existing between the supporting members in a parallel direction with the supporting shaft to press the supporting shaft.

Accordingly, the supporting members come into contact with the supporting shaft through the two contact surfaces and the pressing device presses each supporting member against the supporting shaft in a place between the supporting members in the parallel direction with the supporting shaft. This makes it possible to movably support the member in a more stable manner.

It is also preferred that the supporting shaft has an outer circumferential surface on which a threaded portion is formed to move the member to be supported, and the pressing device is fixed to the member to be supported and includes a rack gear engaging with the threaded portion so as to move the member along the supporting shaft.

Thus, the pressing device fixed to the member allows the rack gear to be pressed and engaged against and with the threaded portion formed on the supporting shaft. It is therefore possible to support the member to be supported and move it smoothly along the supporting shaft.

It is also preferred that the supporting mechanism further comprises a feeding shaft being disposed in parallel with the supporting shaft and having an outer circumferential surface on which a threaded portion is formed to move the member to be supported, and is characterized in that the pressing device is fixed to the member to be supported and includes a rack gear engaging with the threaded portion so as to move the member along the supporting shaft.

Thus, the feeding shaft is provided on its outer circumferential surface with the threaded portion. In addition, the pressing device is fixed to the member to be supported and includes the rack gear engaging with the threaded portion. It is therefore possible to support the member to be supported and move it smoothly along the supporting shaft.

In the supporting mechanism of the present invention, the at least two contact points may be apart from each other in a circumferential direction of the supporting shaft.

The present invention also provides a feeding unit comprising:

(a) a supporting mechanism for movably supporting a member to be supported along a supporting shaft, comprising:

a plurality of supporting members provided on the member, each of said supporting members contacting with the supporting shaft on at least two contact points so as to be movable on the supporting shaft, the at least two contact points being apart from each other, said supporting shaft having an outer circumferential surface on which a threaded portion is formed to move the member to be supported; and a pressing device for pressing the plurality of supporting members against the supporting shaft so that the contact points of each supporting member simultaneously come into contact with the supporting shaft and the plurality of supporting members simultaneously come into contact with the supporting shaft, said pressing device being fixed to the member to be supported and includes a rack gear engaging with the threaded portion so as to move the member along the supporting shaft; and (b) a rotation device for rotating the threaded portion engaging with the rack gear, thereby moving the member to be supported along the supporting shaft.

In such a feeding unit, the pressing device may come into contact with the supporting shaft at a position existing between the supporting members in a parallel direction with the supporting shaft to press the supporting shaft.

The present invention also provides a feeding unit comprising:

(a) a supporting mechanism for movably supporting a member to be supported along a supporting shaft, comprising:

a plurality of supporting members provided on the member, each of said supporting members contacting with the supporting shaft on at least two contact points so as to be movable on the supporting shaft, the at least two contact points being apart from each other;

a pressing device for pressing the plurality of supporting members against the supporting shaft so that the contact points of each supporting member simultaneously come into contact with the supporting shaft and the plurality of supporting members simultaneously come into contact with the supporting shaft, the pressing device being fixed to the member to be supported and including a rack gear engaging with the threaded portion so as to move the member along the supporting shaft; and a feeding shaft being disposed in parallel with the supporting shaft and having an outer circumferential surface on which a threaded portion is formed to move the member to be supported; and (b) a rotation device for rotating the threaded portion engaging with the rack gear, thereby moving the member to be supported along the supporting shaft.

In such a feeding unit, the supporting member may have two contact surfaces, which include the contact points, respectively and are in parallel with the supporting shaft, and the pressing device may come into contact with the supporting shaft at a position existing between the supporting members in a parallel direction with the supporting shaft to press the supporting shaft.

PREFERRED EMBODIMENTS OF THE INVENTION

Various embodiments of the present invention will now be described with reference to the accompanying drawings.

Each embodiment will now be described about a configuration in which the present invention is applied to a feeding unit for moving a pickup optically reading and writing information from and onto an optical disc. The feeding unit is constructed to move the pickup in parallel with an information-recording surface of the optical disc in a radial direction of the surface.

First Embodiment

The first embodiment of the present invention will now be described with reference to FIGS. 1 to 4.

Figure 1:
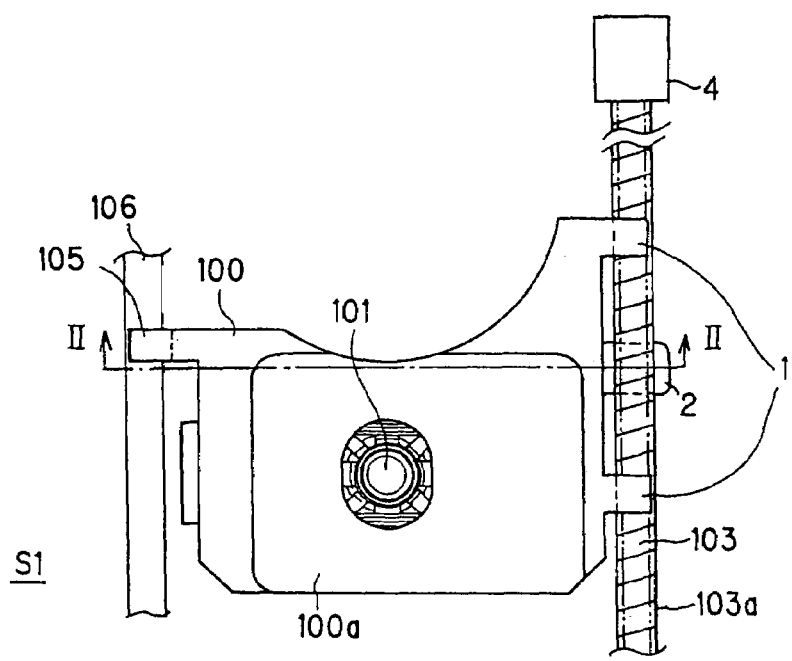
FIG. 1 is a plan view illustrating a feeding unit of the first embodiment of the present invention.
Figure 2:
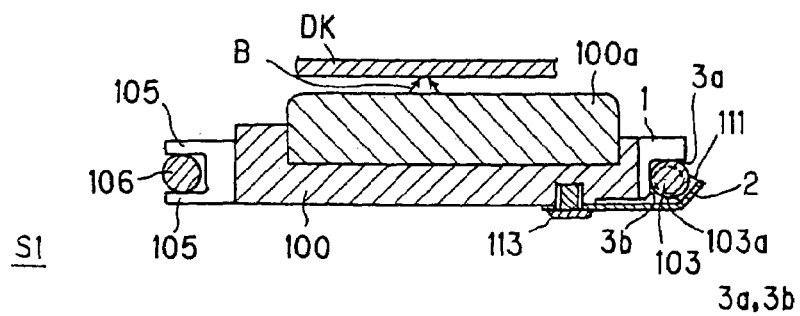
FIG. 2 is a cross-sectional view cut along the line II-II in FIG. 2.
Figure 3:
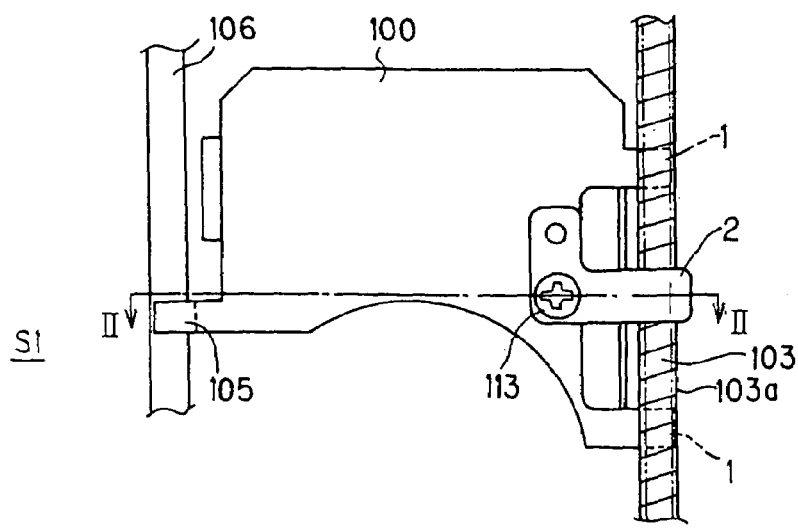
FIG. 3 is a bottom view of the feeding unit as shown in FIG. 1.
Figure 4:
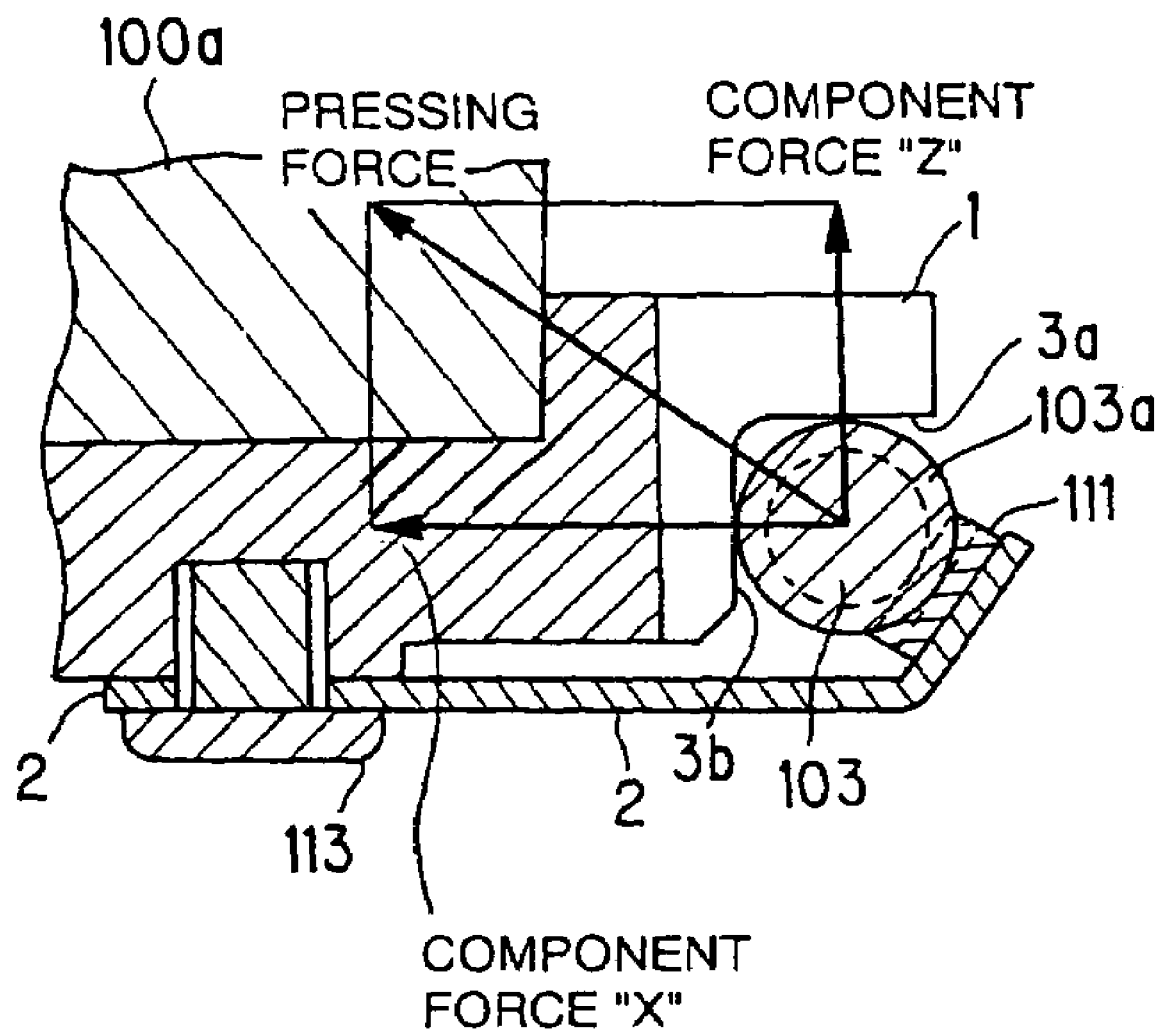
FIG. 4 is an enlarged cross-sectional view illustrating the feeding unit of the first embodiment of the present invention.

FIG. 1 is a plan view illustrating the feeding unit of the first embodiment of the present invention, FIG. 2 is a cross-sectional view cut along the line II-II in FIG. 2, FIG. 3 is a bottom view of the feeding unit as shown in FIG. 1, and FIG. 4 is an enlarged cross-sectional view of the feeding unit of the first embodiment of the present invention, illustrating the main shaft 103 and its peripheral components.

As shown in FIGS. 1 to 3, the feeding unit S1 includes a pickup casing 100 on which a member, i.e., a pickup 100a to be supported is secured. The pickup 100a has a lens 101 and various drive parts. The lens 101 is used to not only radiate an optical beam B but also receive light that reflected on an optical disc DK. The drive parts drive optical parts, such as a semiconductor laser, and the lens 101, both of which produce the optical beam B cooperatively, in the trucking or focus direction of the optical disc DK.

The pickup casing 100 has two sides facing to each other. On one side thereof, two main support members 1 are provided so as to protrude from the side surface of the pickup casing 100. On the other side thereof, one sub support member 105 is provided.

The feeding unit S1 of the first embodiment of the present invention differs from the conventional feeding unit S' in structure and shape of (i) the main support members 1 serving as the supporting members, which are provided on the one of the opposite side surfaces of the pickup casing 100, i.e. the member to be supported, and (ii) a pressing spring 2 serving as the pressing device.

The pressing spring 2 is formed into a leaf spring. The pressing spring 2 has a base end portion and a bent portion. The pressing spring 2 is placed on the bottom of the pickup casing 100 so that its longitudinal direction is perpendicular to the main shaft 103. In such a state, the base end portion of the pressing spring 2 is fixed to the bottom of the pickup casing 100 by means of a screw 113. The bent portion of the pressing spring 2 comes into contact with the main shaft 103 and presses it so that the main shaft 103 is held between the main support member 1 and the bent portion of the pressing spring 2.

A rack gear 111 is provided on the bent portion of the, pressing spring 2 so as to engage with a threaded portion 103a of the main shaft 103. Rotation of the main shaft 103 therefore cause the pickup casing 100 to move. The bent portion of the pressing spring 2 pushes the main shaft 103 against the receiving surfaces 3a and 3b of the support member 1.

The main shaft 103 is located to pass through the two main support members 1 and the pressing spring 2. On the outer circumferential surface of the main shaft 103, a threaded portion 103a is formed in the helical pattern so as to engage with the rack gear 111. The main shaft 103 is driven by an electric motor 4, so that the rotation of the main shaft 103 is transmitted to the rack gear 111.

On the other hand, the sub support member 105 is formed so as to be capable of pinching a sub shaft 106 secured by a not-shown chassis or other members. The sub shaft 106 is directed in parallel with the main shaft 103. This enables the other side of the pickup casing 100 to be supported movably by the sub shaft 106.

In the first embodiment, each of the two main support members 1 has smooth receiving surfaces 3a and 3b, which are at right angles to each other. The receiving surfaces 3a and 3b of the main support member 1 come into contact with the main shaft 103 so that the pickup casing 100 can be supported.

More specifically, as shown in FIG. 2, the tip end of the pressing spring 2, on which the rack gear 111 is provided, is bent at a slight angle. Thus the pressing spring 2 is permitted to apply a pressing force to the main shaft 103 in the directions shown by arrows in FIG. 4. This force caused the main shaft 103 to contact with the receiving surfaces 3a and 3b formed on each main support member 1, thereby producing component forces X and Z at each main support member 1, as illustrated in FIG. 4. The reaction to the component forces X and Z causes each main support member 1 to be pressed against the main shaft 103 at the same time. The one side of the pickup casing 100, on which the main support members 1 are provided, can be supported by the main shaft 103 in such a manner that the pickup casing 100 is prohibited from moving in any direction orthogonal to the movement thereof. Accordingly, no backlash will be caused in the pickup casing 100.

The threaded portion 103a is formed in a helical pattern on the outer circumferential surface of the main shaft 103, like the conventional feeding unit. The rack gear 111 engaging with the threaded portion 103a is pressed through a pressing force generated by the pressing spring 2, as shown in FIG. 4, with the result that the rack gear 111 tightly engages with the threaded portion 103a. With both of the rack gear 111 and the threaded portion 103a engaged therewith, the motor 4 is driven to move the pickup casing 100. Because the rack gear 111 is forced to move along the main shaft 103, with the sub support member 105 allowed to freely travel along the sub shaft 106, the drive of the motor 4 causes the pickup casing 100 together with the pickup 100a to travel in the radial direction of the optical disc DK.

The travel of the pickup casing 100 also causes friction resistance between the sub shaft 106 and a contact surface of the sub support member 105 to the sub shaft 106. This resistance causes the sub support member 105 to move later than the rack gear 111. Such a delay causes a force having a function of turning the pickup casing 100 in the clockwise or counter clockwise direction in FIGS. 1 and 3. However, the two main support members 1 are disposed apart from each other in order to support the pickup casing 100 on the main shaft 103 and the pressing spring 2 pushes a certain intermediate position of the main shaft 103 existing between the two main support members 1. Such a structure prevents the pickup casing 100 from turning in the clockwise or counter clockwise direction.

As described above, the feeding unit S1 of the first embodiment enables each main support member 1 to be pressed against the main shaft 103. In this action, each of the plurality of main support members 1 provided on the pickup casing 100 is brought into contact with the main shaft 103 on at least two points, when the support members 1 move along the main shaft 103. These contact points are apart from each other in the circumferential direction of the main shaft 103 All the contact points of each main support member 1 come into contact with the main shaft 103 simultaneously and all the two main support members 1 come into contact with the main shaft 103 simultaneously on the contact points.

Accordingly, with the main support members 1 pressed on only the two points as they contact the main shaft 103, the main support members 1 still hold the pickup casing 100 in a stable manner. It is unnecessary to form the whole bodies of the main support members 1 with high precision, which helps to reduce a manufacturing cost of the feeding unit itself. Additionally, even when dusts come onto the main shaft 103, influence of such dusts on the movement of the pickup casing 100 can be minimized. Furthermore, a frictional resistance caused between the main support members 1 and the main shaft 103 can be reduced remarkably, providing a smooth movement of the pickup casing 100.

Each of the main support members 1 comes into contact with the main shaft 103 on the two receiving surfaces 3a and 3b. Additionally, the pressing spring 2 comes into contact with the main shaft 103 at a given position between the main support members 1, which causes each main support member 1 to be pressed steadily against the main shaft 103. As a result, the pickup casing 100 can be supported with more stability.

In addition, one end of the pressing spring 2 is secured on the pickup casing 100, and the rack gear 111 is provided on the other end of the spring 2. The rack gear 111 engages with the threaded portion formed on the outer circumferential surface of the main shaft 103. This structure makes it possible to smoothly move the pickup casing 100 along the main shaft 103, while still being supported.

Second Embodiment

The second embodiment of the present invention will now be described with reference to FIGS. 5 to 8.

Figure 5:
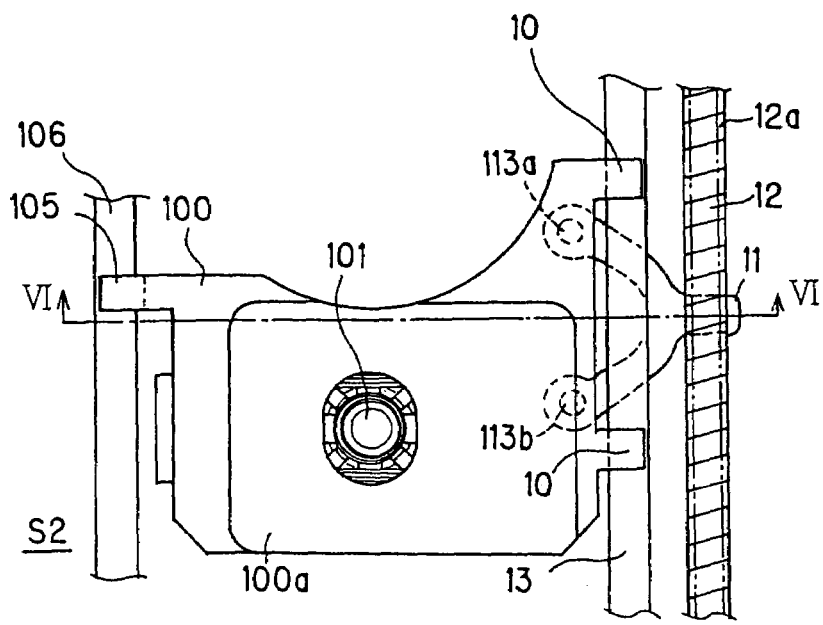
FIG. 5 is a plan view illustrating the feeding unit of the second embodiment of the present invention.
Figure 6:
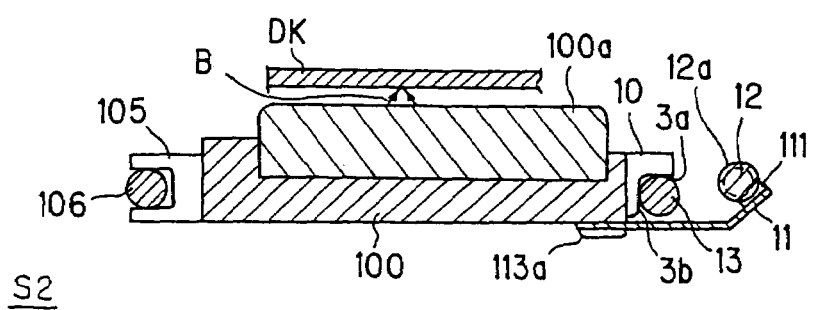
FIG. 6 is a cross-sectional view cut along the line VI-VI in FIG. 5.
Figure 7:
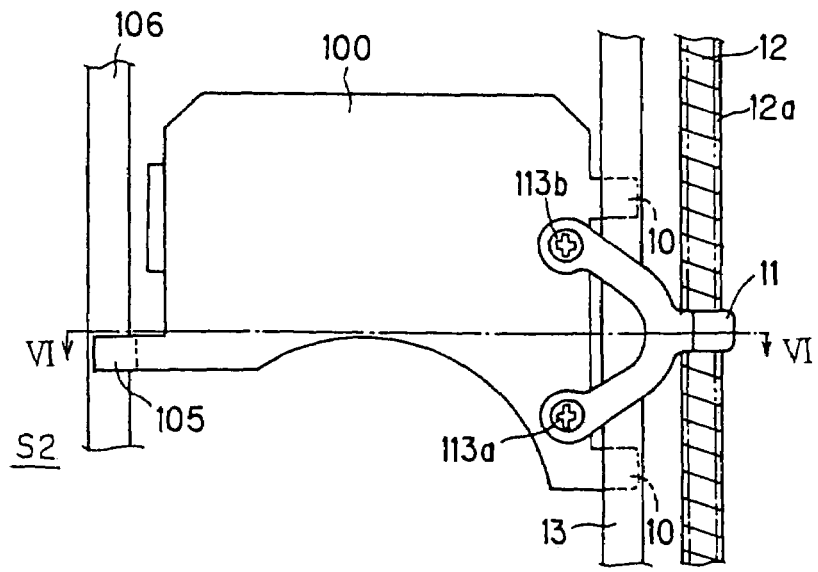
FIG. 7 is a bottom view of the feeding unit as shown in FIG. 5.
Figure 8:
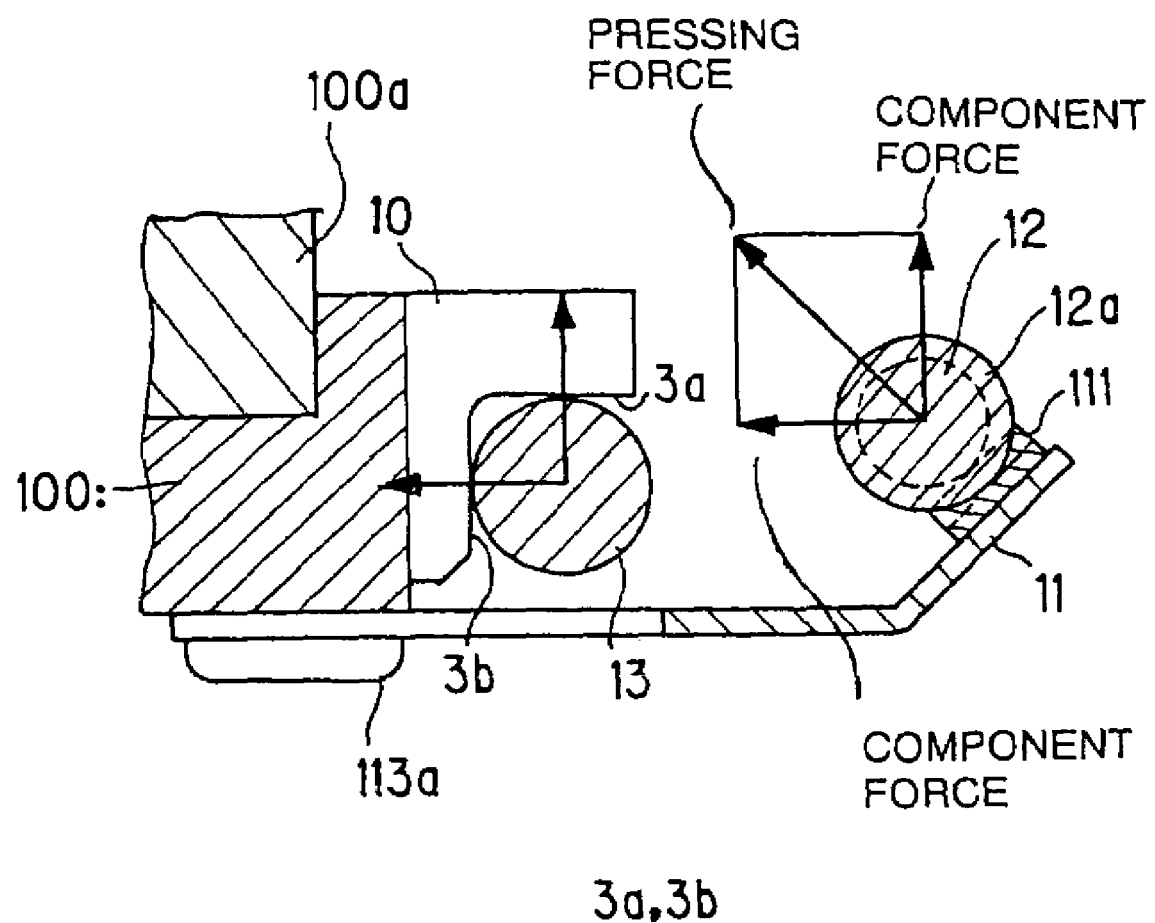
FIG. 8 is an enlarged cross-sectional view illustrating the feeding unit of the second embodiment of the present invention.

FIG. 5 is a plan view illustrating the feeding unit of the second embodiment of the present invention, FIG. 6 is a cross-sectional view cut along the line VI-VI in FIG. 5, FIG. 7 is a bottom view of the feeding unit as shown in FIG. 5, and FIG. 8 is an enlarged cross-sectional view illustrating the feeding unit of the second embodiment of the present invention, illustrating the main shaft 13 and its peripheral components.

In the second embodiment, the same reference numerals are given to the same structural components as those in the first embodiment as shown in FIGS. 1 to 4 as well as in the conventional feeding unit as shown in FIGS. 13 to 16, and detailed explanation thereof will therefore be omitted.

The feeding unit S2 of the second embodiment differs from the conventional feeding unit S' in the following configurations. The feeding unit S2 is provided with main support members 10 and the pressing spring 11, both of which are arranged on the one side of the pickup casing 100 and are different in construction and shape from those in the first embodiment. In addition, unlike the conventional feeding unit S', the main shaft 13 for supporting the pickup casing 100 is provided independently from the feeding shaft 12 on which the threaded portion 12a is formed.

As shown in FIGS. 5 to 7, to support the pickup casing 100, the feeding unit S2 of the second embodiment adopts the sub shaft 106 and the main shaft 13, which is formed into a cylindrical rod-shape with no threaded portion and arranged in parallel with the sub shaft 106. In order to move the pickup casing 100 in parallel with the information-recording surface of an optical disk DK in the radial direction thereof, the feeding shaft 12 is additionally disposed at an outward position beyond the main shaft 13, when viewed from the pickup casing 100, but still parallel with the main shaft 13. On the outer circumferential surface of the feeding shaft 12, a threaded portion 12a is formed to move the pickup casing 100.

On one of the opposite sides of the pickup casing 100 of the second embodiment, two main support members 10 are provided so as to be apart from each other. The main support members 10 come into contact with the main shaft 13 so as to movably support the pickup casing 100 in parallel with the information-recording surface in the radial direction of the optical disc DK. On the other side thereof, the sub support member 105 is provided so as to come into contact with the sub shaft 106. The sub support member 105 also movably supports the pickup casing 100.

Flat receiving surfaces 3a and 3b are formed respectively on each main support member 10 so as to be right angles to each other in the same manner as the main support members 1 described in the first embodiment. The receiving surfaces 3a and 3b come into contact with the main shaft 13 to support the pickup casing 100.

The pressing spring 11 has a length extending from the side edge of the pickup casing 100 on the side of the main shaft 13 to the threaded portion 12. On the tip end of the pressing spring 11, a rack gear 111 is provided to engage with the threaded portion 12a to move the pickup casing 100. Furthermore, the tip end of the rack gear 111 is bent so as to press the feeding shaft 12 in the directions shown by arrows in FIG. 8.

The other ends of the pressing spring 11 are fixed on the pickup casing 100 by screws 113a and 113b. As a result, two forces, which are equal in strength to two component forces of a pressing force caused by the pressing spring 11 to the feeding shaft 12 through the rack gear 111, as shown in FIG. 8, are applied to the main shaft 13 at each main support member 10. The reaction to the two component forces applied to the main shaft 13 causes each main support member 10 to be pressed against the main shaft 13 at the same time. The one side of the pickup casing 100, on which the main support members 10 are provided, can be supported by the main shaft 13 such that the pickup casing 100 is prohibited from moving in any direction orthogonal to the movement thereof. Accordingly, no backlash will be caused in the pickup casing 100.

The threaded portion 12a for moving the pickup casing 100 is formed into a helical pattern on the outer circumferential surface of the feeding shaft 12, as described above. The rack gear 111 engaging with the threaded portion 12a is pressed by a pressing force generated by the pressing spring 2, as shown in FIG. 8, with the result that the rack gear 111 tightly engages with the threaded portion 12a. The rack gear 111 and the threaded portion 12a engage with each other. A not-shown motor is driven to move the pickup casing 100. Because the rack gear 111 is forced to move along the feeding shaft 12 together with the sub support member 105 allowed to freely travel along the sub shaft 106, the drive of the motor causes the pickup casing 100 together with the pickup 100a to travel in the radial direction of the optical disc DK.

The travel of the pickup casing 100 causes a frictional resistance between the sub shaft 106 and the contact surface of the sub support member 105 coming into contact thereto in the same manner as the first embodiment of the present invention. This resistance causes the sub support member 105 to move later than the rack gear 111. Such a delay causes a force having a function of turning the pickup casing 100 in the clockwise or counter clockwise direction in FIGS. 5 to 7. However, the two main support members 10 are disposed apart from each other in order to support the pickup casing 100 on the main shaft 13 and the pressing spring 11 pushes a certain intermediate position of the main shaft 13 existing between the two main support members 10. Such a structure prevents the pickup casing 100 from turning in the clockwise or counter clockwise direction.

As described above, the feeding unit S2 of the second embodiment enables each main support member 10 to be pressed against the main shaft 13. In this action, each of the plurality of main support members 10 provided on the pickup casing 100 is brought into contact with the main shaft 13 on at least two points, when the support members 10 move along the main shaft 13. All the contact points of each main support member 10 come into contact with the main shaft 13 simultaneously and all the two main support members 10 come into contact with the main shaft 13 simultaneously on the contact points.

Accordingly, with the main support members 10 pressed on only the two points as they contact the main shaft 13, the main support members 10 still hold the pickup casing 100 with a stable manner. It is unnecessary to form the whole bodies of the main support members 10 with high precision, which helps to reduce a manufacturing cost of the feeding unit itself. Additionally, even when dusts come onto the main shaft 13, influence of such dusts on the movement of the pickup casing 100 can be minimized. Furthermore, a frictional resistance caused between the main support members 10 and the main shaft 13 can be reduced remarkably, providing a smooth movement of the pickup casing 100.

Each of the main support members 10 comes into contact with the main shaft 13 on the two receiving surfaces 3a and 3b. Additionally, the pressing spring 11 comes into contact with the feeding shaft 12 at a prescribed position between the main support members 10. This causes each main support member 10 to be pressed steadily against the main shaft 13. As a result, the pickup casing 100 can be supported with more stability.

In addition, one end of the pressing spring 11 is secured on the pickup casing 100, and the rack gear 111 is provided on the other end of the spring 11. The rack gear 111 engages with the threaded portion 12a formed on the outer circumferential surface of the feeding shaft 12 disposed in parallel with the main shaft 13. This structure makes it possible to smoothly move the pickup casing 100 along the main shaft 13, while still being supported.

Third Embodiment

The third embodiment of the present invention will now be described with reference to FIGS. 9 to 12.

Figure 9:
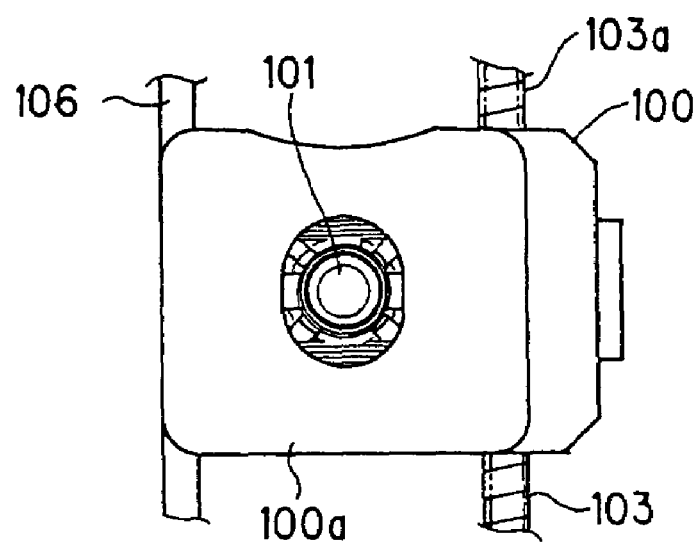
FIG. 9 is a plan view illustrating the feeding unit of the third embodiment of the present invention.
Figure 10:
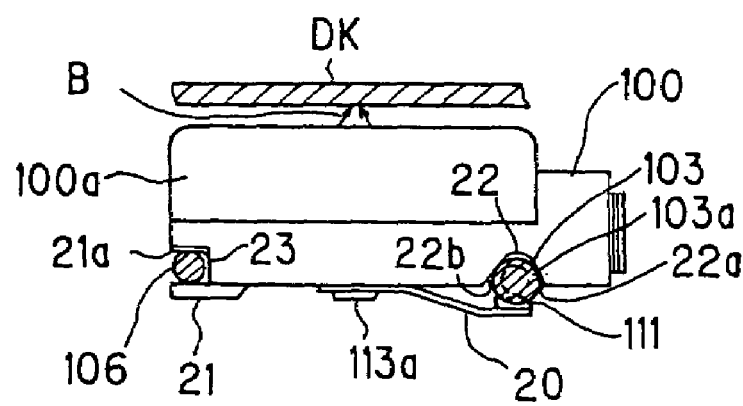
FIG. 10 is a side view of the feeding unit as shown in FIG. 9.
Figure 11:
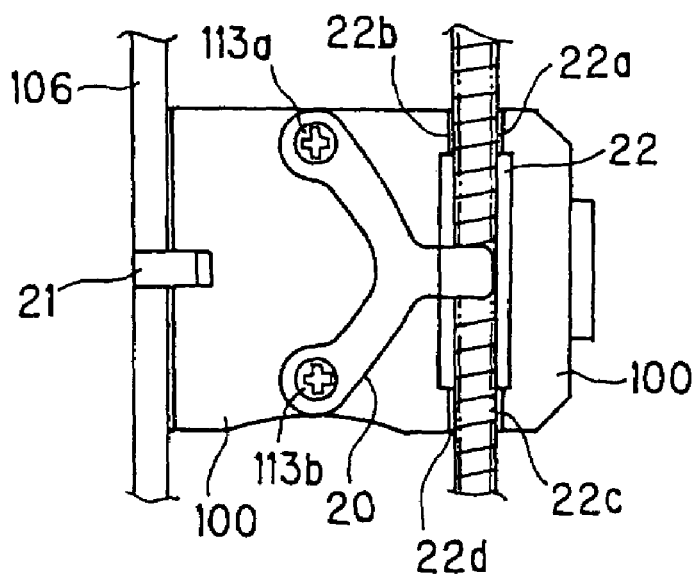
FIG. 11 is a bottom view of the feeding unit as shown in FIG. 9.
Figure 12:
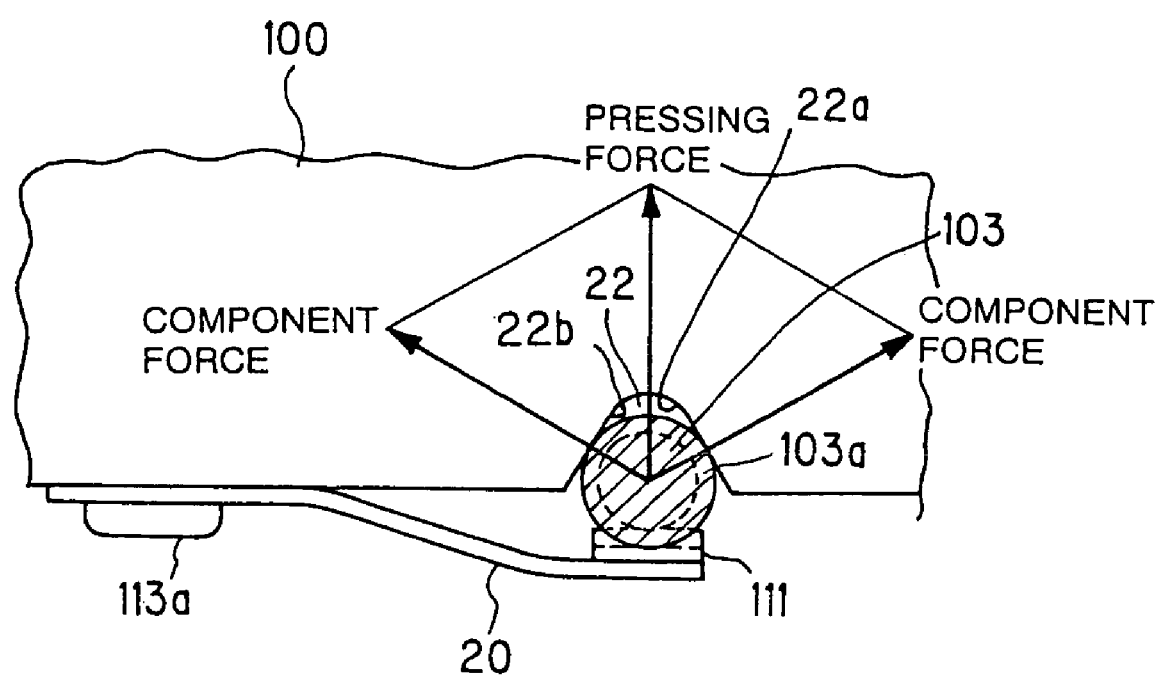
FIG. 12 is an enlarged cross-sectional view illustrating the feeding unit of the third embodiment of the present invention.
Figure 13:
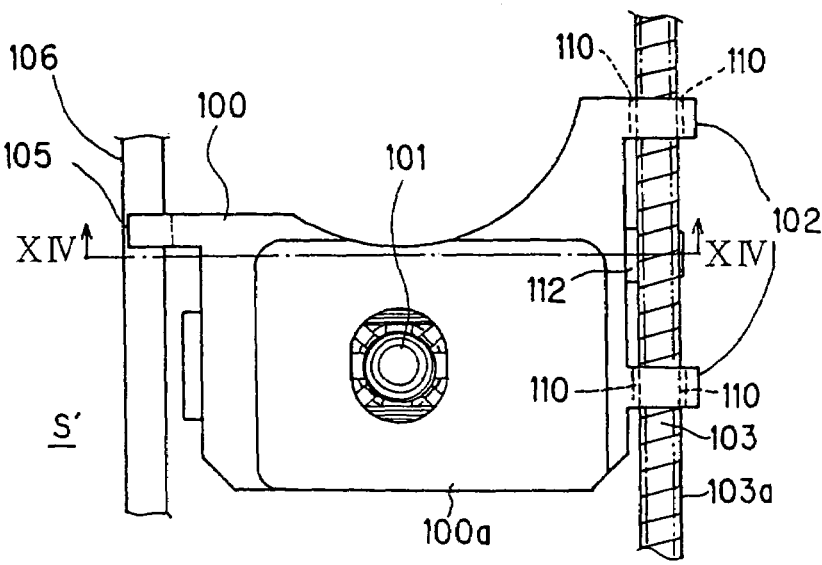
FIG. 13 is a plan view illustrating the conventional feeding unit.
Figure 14:
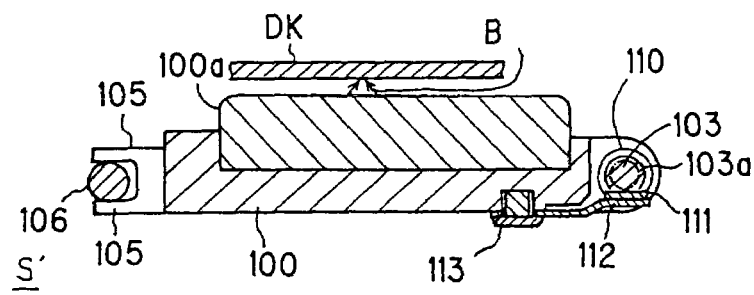
FIG. 14 is a cross-sectional view cut along the line XIV-XIV in FIG. 13.
Figure 15:
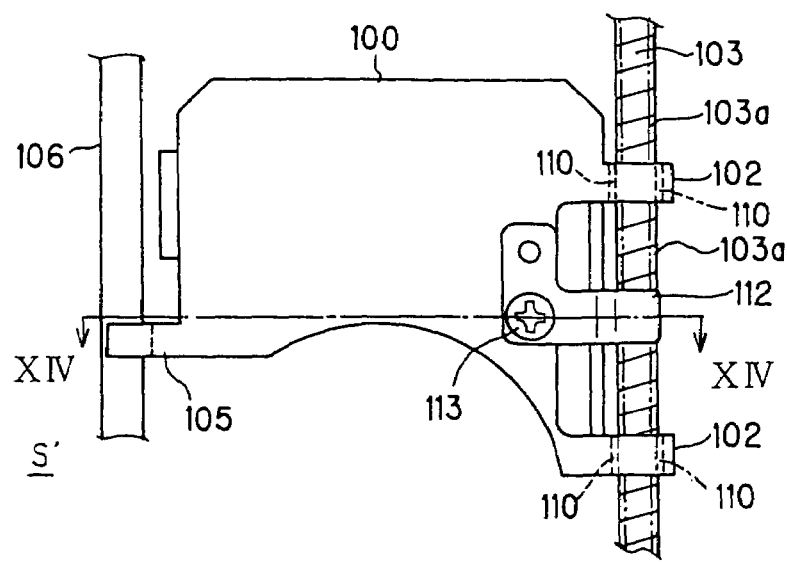
FIG. 15 is a bottom view of the conventional feeding unit as shown in FIG. 13.
Figure 16:
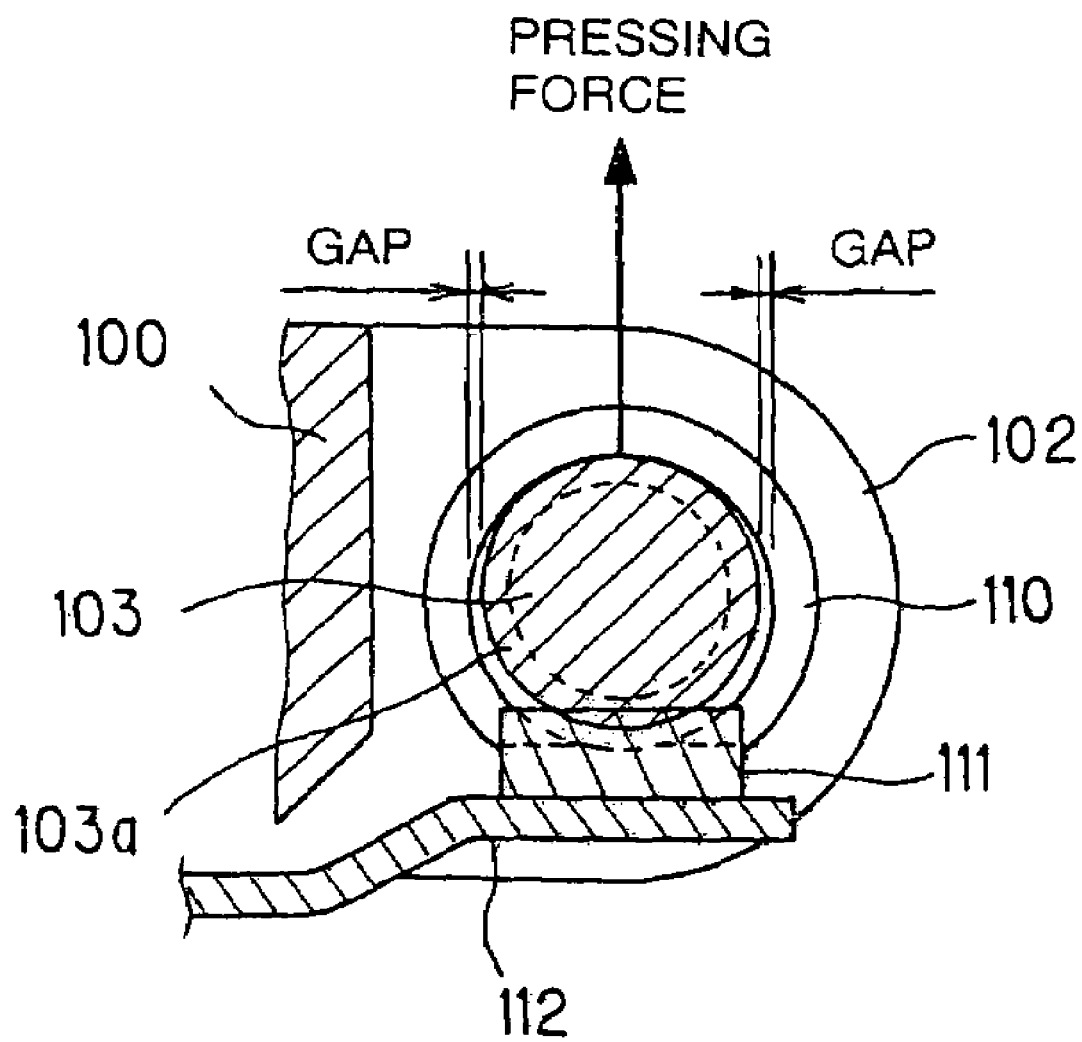
FIG. 16 is an enlarged cross-sectional view illustrating the conventional feeding unit.

FIG. 9 is a plan view illustrating the feeding unit of the third embodiment of the present invention, FIG. 10 is a side view of the feeding unit as shown in FIG. 9, FIG. 11 is a bottom view of the feeding unit as shown in FIG. 9, and FIG. 12 is an enlarged cross-sectional view illustrating the feeding unit of the third embodiment of the present invention, illustrating the main shaft 103 and its peripheral components.

In the third embodiment, the same reference numerals are given to the same structural components as those in the first embodiment as shown in FIGS. 1 to 4 as well as in the conventional feeding unit as shown in FIGS. 13 to 16, and detailed explanation thereof will therefore be omitted.

The feeding unit S3 of the third embodiment differs from the conventional feeding unit S' in the arrangement of both of the sub shaft 106 and the main shaft 103 for supporting the pickup casing 100. More specifically, both of the sub shaft 106 and the main shaft 103 are arranged so as to pass below the pickup casing 100 when viewing from the top. Therefore, the pickup casing 100 is moved so as to bridge a space between the shafts 106 and 103.

As shown in FIGS. 9 to 11, in the feeding unit S3 of the third embodiment, a recess 23, which is rectangular in section with its one side opened, is formed along one end of the bottom of the pickup casing 100. The size of the recess 23 is determined so that the recess 23 exactly receives the sub shaft 106 to support the pickup casing 100. A receiving surface 21a is formed along one wall of the recess 23 and comes into contact with the sub shaft 106 when the recess 23 receives the sub shaft 106. A sub support member 21 is fixed on the bottom so as to cover the lower opening of the recess 23. Thus, the sub shaft 106 can be held between the receiving surface 21a and the sub support member 21, resulting in that one side end of the pickup casing 100 is movably supported along the sub shaft 106.

On the other hand, on the bottom of the pickup casing 100, two recesses 22 are further formed so as to be apart from each other at prescribed positions along a groove on the opposite side to the above-mentioned recess 23. The recesses 22 are used to receive the main shaft 103. Each recess 22 is formed in section into a reversed V-shape, so receiving surfaces 22a and 22b capable of contacting with the main shaft 103 are formed on the walls of each recess 22, respectively. A pressing spring 20 is secured on the bottom of the pickup casing 100. The one end of the pressing spring 20 is located at a center between the recesses 22. Therefore, pinching the main shaft 103 between the recesses 22 (i.e., the receiving surfaces 22a and 22b of each recess 22) and the one end of the pressing spring 20 permits the other side end of the pickup casing 100 to be supported movably.

On the outer circumferential surface of the main shaft 103, a threaded portion 103a is formed to move the pickup casing 100 in parallel with the information-recording surface in the radial direction of an optical disc DK.

The other ends of the pressing spring 20 are fixed on the bottom of the pickup casing 100 by screws 113a and 113b. A rack gear 111 is provided on the tip end of the pressing spring 20 to move the pickup casing 100 by engaging with the threaded portion 103a. As shown in FIG. 12, the pressing spring 20 has a shape so as to press at its end the main shaft 103 in the direction of a pressing force indicated by arrows.

The pressing force permits the main shaft 103 to contact with the receiving surfaces 22a and 22b of each recess 22 simultaneously, generating two component forces as shown in FIG. 12. The reaction to the two component forces causes the receiving surfaces 22a and 22b of each recess 22 to be pressed against the main shaft 103 at the same time. The main shaft 103 can support the pickup casing 100, while preventing the pickup casing 100 from moving in any direction orthogonal to the movement thereof. Accordingly, no backlash will be caused in the pickup casing 100.

The threaded portion 103a for moving the pickup casing 100 is formed in a helical pattern on the outer circumferential surface of the main shaft 103, as described above. The rack gear 111 engaging with the threaded portion 103a is pressed by a pressing force generated by the pressing spring 20, as shown in FIG. 12, with the result that the rack gear 111 tightly engage s with the threaded portion 103a. The rack gear 111 and the threaded portion 103a engaged with each other. A not-shown motor is driven to move the main shaft 103. Because the rack gear 111 is forced to move along the main shaft 103 with the sub support member 21 allowed to freely travel along the sub shaft 106, the drive of the motor causes the pickup casing 100 together with the pickup 100a to travel in the radial direction of the optical disc DK.

The travel of the pickup casing 100 causes a frictional resistance between the sub shaft 106 and the contact surface of the sub support member 21 coming into contact thereto. This resistance causes the sub support member 21 to move later than the rack gear 111. Such a delay causes a force having a function of turning the pickup casing 100 in the clockwise or counter clockwise direction in FIGS. 9 to 11. However, the two recesses 22 (the two sets of receiving surfaces 22a and 22b) are disposed apart from each other in order to support the pickup casing 100 on the main shaft 103 and the pressing spring 20 pushes a certain intermediate region of the main shaft 103 existing between the two recesses 22. Such a structure prevents the pickup casing 100 from turning in the clockwise or counter clockwise direction.

As described above, the feeding unit S3 of the third embodiment enables each recess 22 to be pressed against the main shaft 103. In this action, each of the plurality of recesses 22 formed on the pickup casing 100 is brought into contact with the main shaft 103 on at least two points, when the pickup casing 100 moves along the main shaft 103. All the contact points of each recess 22 come into contact with the main shaft 103 simultaneously and all the two recesses 22 come into contact with the main shaft 103 simultaneously on the contact points.

Accordingly, with the recesses 22 pressed on only the two points as they contact the main shaft 103, the recesses 22 still hold the pickup casing 100 with a stable manner. It is unnecessary to form the whole bodies of the recesses 22 with high precision, which helps to reduce a manufacturing cost of the feeding unit itself. Additionally, even when dusts come onto the main shaft 103, influence of such dusts on the movement of the pickup casing 100 can be minimized. Furthermore, a frictional resistance caused between the recesses 22 and the main shaft 103 can be reduced remarkably to gain a smooth movement of the pickup casing 100.

Each of the recesses 22 is in contact with the main shaft 103 on the two receiving surfaces 22a and 22b. Additionally, the pressing spring 20 comes in contact with the main shaft 103 at a prescribed position between the recesses 22. This causes each recess 22 to be pressed steadily against the main shaft 103. As a result, the pickup casing 100 can be supported with more stability.

In addition, the one end of the pressing spring 20 is fixed on the pickup casing 100, and the rack gear 111 is provided on the other end of the spring 20. The rack gear 111 engages with the threaded portion 103a that is formed on the outer circumferential surface of the main shaft 103. This structure makes it possible to smoothly move the pickup casing 100 along the main shaft 103, while still being supported.

In the above-described embodiments, there is described the present invention, which is applied to the feeding unit including the pickup 100a for optically writing and reading information. The present invention is not limited only to these embodiments, but may be applied to a feeding unit including a pickup for electromagnetically writing and reading information.

The entire disclosure of Japanese Patent Application No. 2001-24733 filed on Jan. 31, 2001 including the specification, claims, drawings and summary is incorporated herein by reference in its entirety.

What is claimed is:

1. A supporting mechanism for an optical pickup for movably supporting a member to be supported along a supporting shaft that serves as a main shaft, comprising:
   a plurality of supporting members provided on the member to be supported, each of said supporting members contacting with the supporting shaft on at least two contact points so as to be movable on the supporting shaft, the at least two contact points being apart from each other;
   a feeding shaft being disposed in parallel with the supporting shaft and having an outer circumferential surface on which a threaded portion is formed to move the member to be supported; and a pressing device for pressing the plurality of supporting members against the supporting shaft so that the contact points of each supporting member simultaneously come into contact with the supporting shaft, the pressing device being fixed to the member to be supported and comprising a spring and a rack gear provided directly on the spring to engage with the threaded portion of the feeding shaft so as to move the member to be supported along the supporting shaft.

2. The supporting mechanism of claim 1, wherein:
the supporting member has two contact surfaces, which include the contact points, respectively and are in parallel with the supporting shaft, and
the pressing device comes into contact with the feeding shaft at a position existing between the supporting members in a parallel direction with the supporting shaft to press the supporting member against the supporting shaft.

3. The supporting mechanism of claim 1, wherein:
the at least two contact points are apart from each other in a circumferential direction of the supporting shaft.

4. The supporting mechanism of claim 1, wherein:
each of said supporting members is opened in a radius direction of the supporting shaft, enabling the supporting shaft to shift in the radius direction thereof to be received in the supporting member.

5. A feeding unit for an optical pickup comprising:
(a) a supporting mechanism for movably supporting a member to be supported along a supporting shaft that serves as a main shaft, comprising:
a plurality of supporting members provided on the member, each of said supporting members contacting with the supporting shaft on at least two contact points so as to be movable on the supporting shaft, the at least two contact points being apart from each other;
a feeding shaft being disposed in parallel with the supporting shaft and having an outer circumferential surface on which a threaded portion is formed to move the member to be supported; and
a pressing device for pressing the plurality of supporting members against the supporting shaft so that the contact points of each supporting member simultaneously come into contact with the supporting shaft, the pressing device being fixed to the member to be supported and comprising a spring and a rack gear provided directly on the spring to engage with the threaded portion of the feeding shaft so as to move the member to be supported along the supporting shaft; and
(b) a rotation device for rotating the threaded portion engaging with the rack gear, thereby moving the member to be supported along the supporting shaft.

6. The feeding unit of claim 5, wherein
the supporting member has two contact surfaces, which include the contact points, respectively and are in parallel with the supporting shaft, and
the pressing device comes into contact with the supporting shaft at a position existing between the supporting members in a parallel direction with the supporting shaft to press the supporting shaft.

7. The supporting mechanism of claim 5, wherein the at least two contact points are apart from each other in a circumferential direction of the supporting shaft.

8. The supporting mechanism of claim 5, wherein:
each of said supporting members is opened in a radius direction of the supporting shaft, enabling the supporting shaft to shift in the radius direction thereof to be received in the supporting member.

9. A supporting mechanism for an optical pickup for movably supporting a member to be supported, comprising:
a main shaft along which the member to be supported is movable, the main shaft having an outer circumferential surface on which a threaded portion is formed;
a plurality of supporting members provided on the member to be supported, each of said supporting members contacting with the main shaft on at least two contact points so as to be movable on the main shaft, the at least two contact points being apart from each other;
a sub shaft being disposed in parallel with the main shaft to guide movement of the member to be supported; and
a pressing device for pressing the plurality of supporting members against the main shaft so that the contact points of each supporting member simultaneously come into contact with the main shaft, the pressing device being fixed to the member to be supported and comprising a spring and a rack gear provided directly on the spring to engage with the threaded portion of the main shaft so as to move the member to be supported along the main shaft.

10. A feeding unit for an optical pickup comprising:
(a) a supporting mechanism for movably supporting a member to be supported, comprising:
a main shaft along which the member to be supported is movable, the main shaft having an outer circumferential surface on which a threaded portion is formed;
a plurality of supporting members provided on the member to be supported, each of said supporting members contacting with the main shaft on at least two contact points so as to be movable on the main shaft, the at least two contact points being apart from each other;
a sub shaft being disposed in parallel with the main shaft to guide movement of the member to be supported; and
a pressing device for pressing the plurality of supporting members against the main shaft so that the contact points of each supporting member simultaneously come into contact with the main shaft, the pressing device being fixed to the member to be supported and comprising a spring and a rack gear provided directly on the spring to engage with the threaded portion of the main shaft so as to move the member to be supported along the main shaft; and
(b) a rotation device for rotating the threaded portion engaging with the rack gear, thereby moving the member to be supported along the main shaft.

* * * * *